US009287571B2

(12) United States Patent
McElroy et al.

(10) Patent No.: US 9,287,571 B2
(45) Date of Patent: Mar. 15, 2016

(54) OPERATION OF FUEL CELL SYSTEMS WITH REDUCED CARBON FORMATION AND ANODE LEADING EDGE DAMAGE

(75) Inventors: James F. McElroy, Suffield, CT (US); David Weingaertner, Sunnyvale, CA (US); Swaminathan Venkataraman, Cupertino, CA (US); Stephen Couse, Sunnyvale, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 455 days.

(21) Appl. No.: 12/507,670

(22) Filed: Jul. 22, 2009

(65) Prior Publication Data

US 2010/0047637 A1 Feb. 25, 2010

Related U.S. Application Data

(60) Provisional application No. 61/129,838, filed on Jul. 23, 2008.

(51) Int. Cl.
*H01M 8/06* (2006.01)
*H01M 8/12* (2006.01)

(52) U.S. Cl.
CPC .......... *H01M 8/0618* (2013.01); *H01M 8/0637* (2013.01); *H01M 2008/1293* (2013.01); *Y02E 60/50* (2013.01); *Y02E 60/525* (2013.01)

(58) Field of Classification Search
CPC ............ H01M 8/0618; H01M 8/0637; H01M 2008/1293; Y02E 60/525
USPC ......... 429/415, 420, 423, 514, 457, 458, 459, 429/465, 460, 469, 483
See application file for complete search history.

(56) References Cited

U.S. PATENT DOCUMENTS

| | | | |
|---|---|---|---|
| 4,426,269 | A | 1/1984 | Brown et al. |
| 4,575,407 | A | 3/1986 | Diller |
| 4,792,502 | A | 12/1988 | Trocciola et al. |
| 4,804,592 | A | 2/1989 | Vanderborgh et al. |
| 4,847,173 | A | 7/1989 | Mitsunnaga et al. |
| 4,898,792 | A | 2/1990 | Singh et al. |
| 4,925,745 | A | 5/1990 | Remick et al. |
| 4,983,471 | A | 1/1991 | Reichner et al. |
| 5,047,299 | A | 9/1991 | Shockling |

(Continued)

FOREIGN PATENT DOCUMENTS

| | | |
|---|---|---|
| WO | WO 2004/093214 | 10/2004 |
| WO | 2011011286 | 1/2011 |

OTHER PUBLICATIONS

U.S. Appl. No. 11/491,487, filed Jul. 24, 2006, McElroy.

(Continued)

*Primary Examiner* — Ula C Ruddock
*Assistant Examiner* — Thomas Parsons
(74) *Attorney, Agent, or Firm* — The Marbury Law Group PLLC

(57) ABSTRACT

A method of operating a fuel cell system includes introducing a fuel mixture comprising hydrogen, fuel, and steam at a fuel inlet of the fuel cell system, and operating the fuel cell system to generate electricity. A ratio of hydrogen to carbon from fuel ($H_2$:$C_{fuel}$) in the fuel mixture is within a range of 0.25:1 to 3:1, inclusive; and a ratio of steam to carbon (S:C) in the fuel mixture is less than 2:1.

22 Claims, 10 Drawing Sheets

(56) References Cited

U.S. PATENT DOCUMENTS

| | | | | |
|---|---|---|---|---|
| 5,071,719 | A * | 12/1991 | Rostrup-Nielsen et al. | 429/415 |
| 5,143,800 | A | 9/1992 | George et al. | |
| 5,147,735 | A * | 9/1992 | Ippommatsu et al. | 429/412 |
| 5,169,730 | A | 12/1992 | Reichner et al. | |
| 5,170,124 | A | 12/1992 | Blair et al. | |
| 5,302,470 | A | 4/1994 | Okada et al. | |
| 5,441,821 | A | 8/1995 | Merritt et al. | |
| 5,498,487 | A | 3/1996 | Ruka et al. | |
| 5,501,914 | A | 3/1996 | Satake et al. | |
| 5,505,824 | A | 4/1996 | McElroy | |
| 5,527,631 | A | 6/1996 | Singh et al. | |
| 5,573,867 | A | 11/1996 | Zafred et al. | |
| 5,589,285 | A | 12/1996 | Cable et al. | |
| 5,601,937 | A | 2/1997 | Isenberg | |
| 5,686,196 | A | 11/1997 | Singh et al. | |
| 5,688,609 | A | 11/1997 | Rostrup-Nielsen et al. | |
| 5,733,675 | A | 3/1998 | Dederer et al. | |
| 5,741,440 | A * | 4/1998 | Cooper et al. | 252/373 |
| 5,741,605 | A | 4/1998 | Gillett et al. | |
| 5,922,488 | A | 7/1999 | Marucchi-Soos et al. | |
| 5,955,039 | A | 9/1999 | Dowdy | |
| 6,013,385 | A | 1/2000 | DuBose | |
| 6,083,636 | A | 7/2000 | Hsu | |
| 6,106,964 | A | 8/2000 | Voss et al. | |
| 6,238,816 | B1 | 5/2001 | Cable et al. | |
| 6,280,865 | B1 | 8/2001 | Eisman et al. | |
| 6,329,090 | B1 | 12/2001 | McElroy et al. | |
| 6,403,245 | B1 | 6/2002 | Hunt | |
| 6,436,562 | B1 | 8/2002 | DuBose et al. | |
| 6,451,466 | B1 | 9/2002 | Grasso et al. | |
| 6,489,050 | B1 | 12/2002 | Ruhl et al. | |
| 6,562,496 | B2 | 5/2003 | Faville et al. | |
| 6,623,880 | B1 | 9/2003 | Geisbrecht et al. | |
| 6,623,881 | B2 | 9/2003 | Badding et al. | |
| 6,649,291 | B1 * | 11/2003 | Iijima et al. | 429/411 |
| 6,677,070 | B2 | 1/2004 | Kearl | |
| 6,821,663 | B2 | 11/2004 | McElroy et al. | |
| 6,924,053 | B2 | 8/2005 | McElroy | |
| 7,255,956 | B2 | 8/2007 | McElroy | |
| 7,520,916 | B2 | 4/2009 | McElroy et al. | |
| 7,591,880 | B2 | 9/2009 | Levan et al. | |
| 2001/0049035 | A1 | 12/2001 | Haltiner, Jr. et al. | |
| 2002/0028362 | A1 | 3/2002 | Prediger et al. | |
| 2002/0028367 | A1 | 3/2002 | Sammes et al. | |
| 2002/0058175 | A1 | 5/2002 | Ruhl | |
| 2002/0098406 | A1 | 7/2002 | Huang et al. | |
| 2002/0106544 | A1 | 8/2002 | Noetzel et al. | |
| 2003/0049518 | A1 * | 3/2003 | Nanaumi et al. | 429/44 |
| 2003/0162067 | A1 | 8/2003 | McElroy | |
| 2003/0196893 | A1 | 10/2003 | McElroy | |
| 2004/0081859 | A1 | 4/2004 | McElroy et al. | |
| 2004/0136901 | A1 * | 7/2004 | Bakker et al. | 423/648.1 |
| 2004/0191597 | A1 | 9/2004 | McElroy | |
| 2004/0191598 | A1 | 9/2004 | Gottmann et al. | |
| 2004/0202914 | A1 | 10/2004 | Sridhar et al. | |
| 2004/0224193 | A1 | 11/2004 | Mitlitsky et al. | |
| 2004/0247970 | A1 | 12/2004 | Irvine et al. | |
| 2005/0048334 | A1 | 3/2005 | Sridhar et al. | |
| 2006/0040168 | A1 | 2/2006 | Sridhar | |
| 2006/0166070 | A1 | 7/2006 | Hickey | |
| 2006/0204827 | A1 | 9/2006 | Hickey et al. | |
| 2007/0017368 | A1 | 1/2007 | Levan et al. | |
| 2007/0178338 | A1 | 8/2007 | McElroy et al. | |
| 2007/0287048 | A1 | 12/2007 | Couse et al. | |
| 2008/0076006 | A1 | 3/2008 | Gottmann et al. | |
| 2008/0096080 | A1 | 4/2008 | Batawi et al. | |
| 2008/0193825 | A1 | 8/2008 | Nguyen et al. | |
| 2008/0199738 | A1 | 8/2008 | Perry et al. | |
| 2008/0254336 | A1 | 10/2008 | Batawi | |

OTHER PUBLICATIONS

J.M. Sedlak, J. F. Austin and A. B. LaConti, “Hydrogen Recovery and Purification Using the Solid Polymer Electrolyte Electrolysis Cell,” Int. J. Hydrogen Energy, vol. 6, pp. 45-51. (1981).

Low Cost, Compact Solid Oxide Fuel Cell Generator, http://www.odod.state.oh.us/tech/sbir/Program_Services/TechLink/Tmi.PDF.

EG&G Services, Parsons, Inc., SAIC, Fuel Cell Handbook, 5th edition. USDOE. Oct. 2000. 9-1-9-4; 9-12-9-14.

PCT/US2010/042316, “Operation of Fuel Cell Systems with Reduced Carbon Formation and Anode Leading Edge Damage,” Written Opinion & International Search Report, Feb. 25, 2011, 9pgs.

Taiwanese Office Action and search report received in connection with Taiwan Patent Application No. 098124907, issued Mar. 13, 2014.

English translation of the Taiwanese Office Action and search report received in connection with Taiwan Patent Application No. 098124907, issued Mar. 13, 2014.

* cited by examiner

OPERATION OF FUEL CELL SYSTEMS WITH REDUCED CARBON FORMATION AND ANODE LEADING EDGE DAMAGE

CROSS-REFERENCE TO RELATED PATENT APPLICATION

The present application claims benefit of U.S. provisional application 61/129,838, filed Jul. 23, 2008, which is incorporated herein by reference in its entirety.

BACKGROUND OF THE INVENTION

The present invention relates generally to the field of fuel cell systems and more particularly to operation of fuel cell systems to allow for efficient, extended-life operation with decreased anode leading edge damage and carbon deposition.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide reversible fuel cells, that also allow reversed operation, such that water or other oxidized fuel can be reduced to unoxidized fuel using electrical energy as an input.

In a high temperature fuel cell system, such as a solid oxide fuel cell (SOFC) system, an oxidizing gas is passed through the cathode side of the fuel cell while a fuel flow is passed through the anode side of the fuel cell. The oxidizing gas is typically air, while the fuel flow is typically a hydrogen-rich gas created by reforming a hydrocarbon fuel source. Water may also be introduced into the system in the form of steam. The fuel cell, typically operating at a temperature between 750° C. and 950° C., enables the transport of negatively charged oxygen ions from the cathode flow stream to the anode flow stream, where the ions combine with either free hydrogen or hydrogen in a hydrocarbon molecule to form water vapor and/or with carbon monoxide to form carbon dioxide. The excess electrons from the negatively charged ions are routed back to the cathode side of the fuel cell through an electrical circuit completed between anode and cathode, resulting in an electrical current flow through the circuit.

SUMMARY

The first aspect of the present invention is methods of operating a fuel cell system in which hydrogen is introduced into the fuel cell system together with the fuel stream at a ratio within the range of 0.25:1 and 3:1 hydrogen:carbon from fuel ($H_2$:$C_{fuel}$) at the fuel inlet. In embodiments of this aspect, steam is provided with the fuel flow such that the system operates at a steam:carbon (S:C) ratio of less than 2:1.

The second aspect of the present invention is a method of operating a fuel cell system including introducing a fuel mixture comprising hydrogen, fuel, and steam at a fuel inlet of the fuel cell system, and operating the fuel cell system to generate electricity. A ratio of hydrogen to carbon from fuel ($H_2$:$C_{fuel}$) in the fuel mixture is within a range of 0.25:1 to 3:1, inclusive; and a ratio of steam to carbon (S:C) in the fuel mixture is less than 2:1.

A third aspect of the present invention is a solid oxide fuel cell stack, comprising a plurality of solid oxide fuel cells and a plurality of interconnects. Each of the plurality of fuel cells comprises a solid oxide electrolyte, an anode electrode adapted for internal fuel reformation, and a cathode electrode. The anode electrode and the cathode electrode are symmetrical in a region where fuel enters the fuel cell.

BRIEF DESCRIPTION OF THE DRAWINGS

FIG. 1 demonstrates a change in steam to carbon (S:C) ratio from in excess of 2:1 to about 1.4:1.

FIG. 2 demonstrates a change in cell voltages as the S:C ratio is changed from about 2:1 to about 1.4:1.

FIG. 3 demonstrates a change in S:C ratio from about 1.4:1 to about 1.2:1.

FIG. 4 demonstrates a change in cell voltages as the S:C ratio is changed from about 1.4:1 to about 1.2:1.

FIG. 5 demonstrates a change in S:C ratio from about 1.8:1 to about 1.6:1.

FIG. 6 demonstrates a change in cell voltages as the S:C ratio is changed from about 1.8:1 to about 1.6:1.

DETAILED DESCRIPTION OF THE PREFERRED EMBODIMENTS

Figure 1:
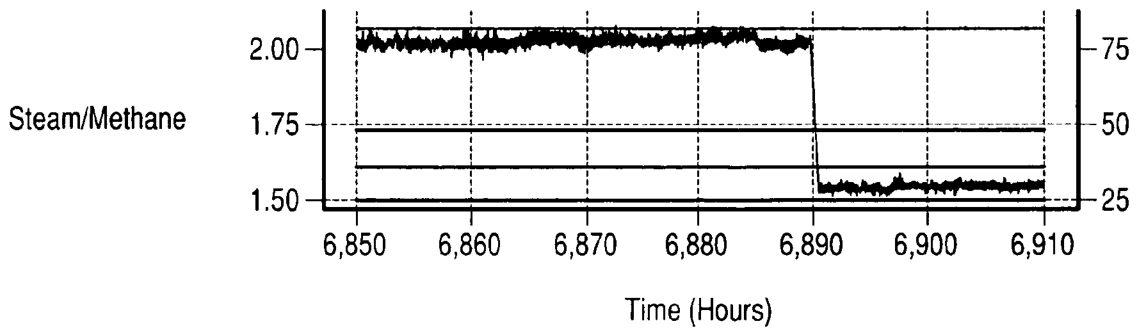
FIG. 1 is a plot of S:C ratio versus time of a SOFC operating with externally reformed natural gas as fuel and hydrogen ($H_2$) being introduced with the fuel at a hydrogen to methane ($H_2$:$CH_4$) ratio of about 1:1 at the fuel inlet across an approximately sixty hour time interval. For purposes of determining the steam to carbon (S:C) and hydrogen to methane ($H_2$:$CH_4$) ratios, natural gas was assumed to be 100% methane ($CH_4$).

One problem associated with operation of state of the art SOFCs using hydrocarbon fuels is a tendency for internal carbon formation and deposition on anode electrodes. If left unchecked, internal carbon formation and deposition results in decreased anode efficiency and reduced useful device lifetime. Typically, a measured amount of steam is introduced with the fuel in order to reduce carbon formation and deposition in such systems. Unfortunately, adding steam is not without undesirable consequences. First, introducing steam into a SOFC fuel has the undesirable effect of decreasing efficiency (i.e., lower observed optimum cell voltages). Second, introducing steam into a SOFC fuel may have the undesirable effect of causing the fuel cell anode to suffer from anode leading edge damage, sometimes called "anode dusting," which results in accelerated cell voltage degradation. Third, introducing steam into a SOFC fuel may have the undesirable effect of deteriorating the anode seals leading to cross reactant leakage with time.

Typically, steam and fuel flows into a fuel cell are controlled such that the steam:carbon (S:C) ratio at the fuel inlet stays within a nominal operating range. The use of S:C ratios for parameterized control of fuel cells is described in detail in U.S. patent application Ser. No. 12/149,816 (filed on May 8, 2008), hereby incorporated by reference in its entirety. As described therein, SOFCs operating with methane as fuel typically require a S:C ratio in the range of 2:1 to 3:1. However, certain fuels are more susceptible to carbon formation and deposition than others. Some of this disparate behavior can be mitigated by tailoring the S:C ratio for the particular fuel being used, but there are limits to such tailoring. For example, carbon formation is typically an observed difficulty in propane fueled SOFC systems even operating with relatively high S:C ratios.

Fuel Cell Operation with Introduction of Hydrogen with Fuel

In one aspect of the invention, the inventors have realized that a fuel cell system can be operated with comparable or even diminished carbon formation and deposition at reduced S:C ratios when hydrogen is introduced into the fuel cell system together with the fuel at the fuel inlet. A fuel cell system operating in such a manner displays an unexpected increase in cell voltage and significantly longer operating time before an average minimum cell voltage is reached. The benefits of the present invention apply even in systems operating with fuels known to be susceptible to carbon formation, such as propane and other higher hydrocarbons.

Preferably the fuel cell system operating as described above contains one or more solid oxide fuel cell (SOFC) stacks. A detailed description of a type of SOFC system is described in U.S. patent application Ser. Nos. 11/491,487 (filed on Jul. 24, 2006), 11/491,488 (filed on Jul. 24, 2006), and 11/002,681 (filed on Dec. 3, 2004), all hereby incorporated by reference in their entirety.

A practical fuel cell system, such as a SOFC system, can comprise elements which include but are not limited to: steam generator(s), reformer(s), heat exchanger(s), blower(s), condenser(s), vent(s), mixer(s), catalytic reactor(s) or any combination thereof.

"Catalytic reactor" as used herein describes an element in a fuel cell system capable of catalyzing a reaction between reactants conveyed thereto. These reactors typically comprise metal catalyst-containing tubes or other conduits. Catalytic reactors may be located at various places in a fuel cell system, and may be internal or external. Examples of catalytic reactors include, but are not limited to catalytic partial oxidation (CPOx) reactors and anode tail gas oxidation (ATO) reactors. A detailed description of a type of catalytic reactor is described in U.S. patent application Ser. No. 11/703,152 (filed on Feb. 7, 2007), which is hereby incorporated by reference in its entirety.

As used herein, the term "hydrogen flow rate" is used to express the quantity of molecular hydrogen introduced into the fuel cell stack or system with the fuel at the fuel inlet. Typically this measurement is expressed in units of standard liters per minute (SLPM), although one skilled in the art would recognize that these units can readily be converted into moles per second.

As used herein, the term "water flow rate" is used to express the sum of the quantity of water introduced into the fuel cell stack or system with the fuel and the anode recycle water, if present. Water introduced into the fuel cell stack or system typically will be in the form of vapor, i.e., steam. Typically this measurement is expressed in units of standard liters per minute (SLPM), although one skilled in the art would recognize that these units can readily be converted into moles per second.

As used herein, the term "fuel flow rate" is used to express the quantity of fuel introduced into the fuel cell. Typically this measurement is expressed in units of standard liters per minute (SLPM), although one skilled in the art would recognize that these units can readily be converted into moles per second.

As used herein, the term "hydrocarbon fuel" is used to indicate a typical fuel for fuel cell operation comprising hydrogen and carbon. Examples of typical fuels for fuel cell operation include but are not limited to hydrocarbons (including methane, ethane and propane), natural gas, alcohols, and syngas derived from coal or natural gas reformation.

As used herein, the term "alcohol" is used to generally indicate an organic compound derivatized with a hydroxyl group. Examples of alcohols include, but are not limited to methanol, ethanol, and isopropyl alcohol.

As used herein, the term "fuel composition" refers to the elemental composition of fuel. This elemental composition is typically expressed in moles [X] per mole of fuel, where [X] is an element of interest. Examples of elements of interest that may be useful for the determination of typical control parameters for the operation of a SOFC include carbon, oxygen, hydrogen and optionally nitrogen. For liquid based fuels, elemental composition may also be expressed as moles [X] per milliliter of fuel or moles [X] per gram of fuel.

As used herein, use of the terms "about" and "approximately" in reference to numerical ratios refers to an inclusive range of plus or minus 10% of the indicated value.

As used herein, the term "controllably providing the exhaust stream into the inlet stream" means that the amount of fuel exhaust provided into a fuel inlet stream is actively controlled as opposed to passively provided into the fuel inlet stream without control. Thus, simply routing a part of the exhaust stream into the fuel inlet stream through a "T"-shaped branched pipe is not controllably providing the exhaust stream into the inlet stream. The amount of fuel exhaust being recycled can be controlled by the operator or by a computer by controlling one or both of the valve 201 and/or the blower 209. For example, the valve 201 may be controlled to vary the ratio of the first separated fuel exhaust stream to the second separated fuel exhaust stream. In other words, if more steam is needed in the fuel inlet stream, then the valve may increase the portion of the fuel exhaust stream which is provided into the first separated fuel exhaust stream. If less steam is needed in the fuel inlet stream, then the valve may decrease the portion of the fuel exhaust stream which is provided into the first separated fuel exhaust stream. The blower 209 may be controlled by increasing or decreasing the blowing speed or rate to increase or decrease the amount of fuel exhaust being provided by the blower 209 into the fuel inlet stream depending on whether more or less steam is required in the fuel inlet stream.

As used herein, the term "symmetrical" (as used to describe the relationship between the shape of an anode and the shape of a cathode) is meant to indicate that the outer edge of the anode is exactly or substantially aligned with the outer edge of the cathode on the opposite side of the electrolyte in the same fuel cell in the region of comparison. Conversely, an anode and cathode that have boundaries that are not aligned are said to be asymmetrical in the region of misalignment. Thus, an anode may be symmetrical with a cathode at one edge, while asymmetrical at another.

Steam:Carbon Ratio

As stated above, derivation and utilization of the steam: carbon (S:C) ratio as a control parameter for fuel cell operation is described in detail in U.S. patent application Ser. No. 12/149,816. The steam:carbon (S:C) ratio is typically derived from water flow rate, fuel flow rate, and carbon composition of the fuel (expressed as moles of carbon per moles of fuel). The water flow rate and fuel flow rate are variable quantities that can be adjusted by the operator to keep the S:C ratio within a nominal operating range. The fuel composition may be theoretically derived from the composition of the fuel used.

For example, if methane gas (i.e., $CH_4$) is used for fuel, then stoichiometric analysis indicates that there is one mole of carbon for every one mole of fuel. However, if ethanol (i.e., $CH_3CH_2OH$) is used, stoichiometric analysis indicates that there are two moles of carbon for every one mole of fuel. As it is possible that sources of fuel for fuel cell systems may be mixtures of unknown quantities of two or more fuels, such theoretical stoichiometric analysis may not always be suitable. In such cases, characterization of the carbon content of the fuel may be obtained from other sources, i.e., through direct detection or gathering the information from the commercial provider of the fuel.

Once the carbon content of the fuel is determined or obtained, the S:C ratio can be derived as follows. The S:C ratio is equal to the water flow rate divided by the fuel flow rate multiplied by carbon content of the fuel:

S:C ratio=Water Flow Rate:Carbon Flow Rate;

where Carbon Flow Rate=Fuel Flow Rate*mol C/mol Fuel; and Water Flow Rate=Molar Flow Rate of Steam from the steam generator+Anode Recycle Flow Rate*Mole Fraction of Water in the Anode Recycle Stream.

In alternative methods of determining the S:C ratio, carbon content of the anode recycle stream (in the form of CO and $CO_2$) is also included in the Carbon Flow Rate. Similarly, in alternative methods, $CO_2$ content of the fuel stream is included in the Carbon Flow Rate. Inclusion of the contribution from $CO_2$ and CO to the Carbon Flow Rate is more important in systems where a significant portion of the anode exhaust stream is recycled or the fuel is biogas, which typically will have a much greater fraction of $CO_2$ than other fuel sources.

The amount of fuel and steam being introduced into a fuel cell can be varied continuously or intermittently to preferably maintain the S:C ratio in the fuel inlet stream during operation of the fuel cell stack within a nominal operating range. When an appropriate amount of hydrogen is being introduced into the fuel cell together with the fuel, the preferred range of the S:C ratio is less than about 2:1.

Hydrogen:Carbon Ratio

In order to operate a fuel cell system at these lower S:C ratios, atomic or molecular hydrogen is provided with the fuel at the fuel inlet. The amount of hydrogen being introduced into the system can be represented as a ratio of molecular hydrogen to carbon from fuel ($H_2$:$C_{fuel}$ ratio) introduced at the fuel inlet.

Derivation of the $H_2$:$C_{fuel}$ ratio is similar to the derivation of the S:C ratio described above. The $H_2$:$C_{fuel}$ ratio is equal to the hydrogen flow rate divided by the fuel flow rate multiplied by carbon content of the fuel:

$H_2$:$C_{fuel}$ ratio=Hydrogen Flow Rate:(Fuel Flow Rate*mol C/mol Fuel);

Thus, for all systems operating with methane as fuel, the $H_2$:$C_{fuel}$ ratio is equivalent to, and may herein be referred to as the $H_2$:$CH_4$ ratio.

The relative amounts of hydrogen and fuel being introduced into a fuel cell can be varied continuously or intermittently to preferably maintain the $H_2$:$C_{fuel}$ ratio in the fuel inlet stream during operation of the fuel cell stack within a nominal operating range. In preferred embodiments, the nominal operating range of the $H_2$:$C_{fuel}$ ratio is typically between 0.25:1 to 3:1 $H_2$:$C_{fuel}$; preferably between 0.5:1 and 1.5:1 $H_2$:$C_{fuel}$.

Sources of Hydrogen

Figure 7:
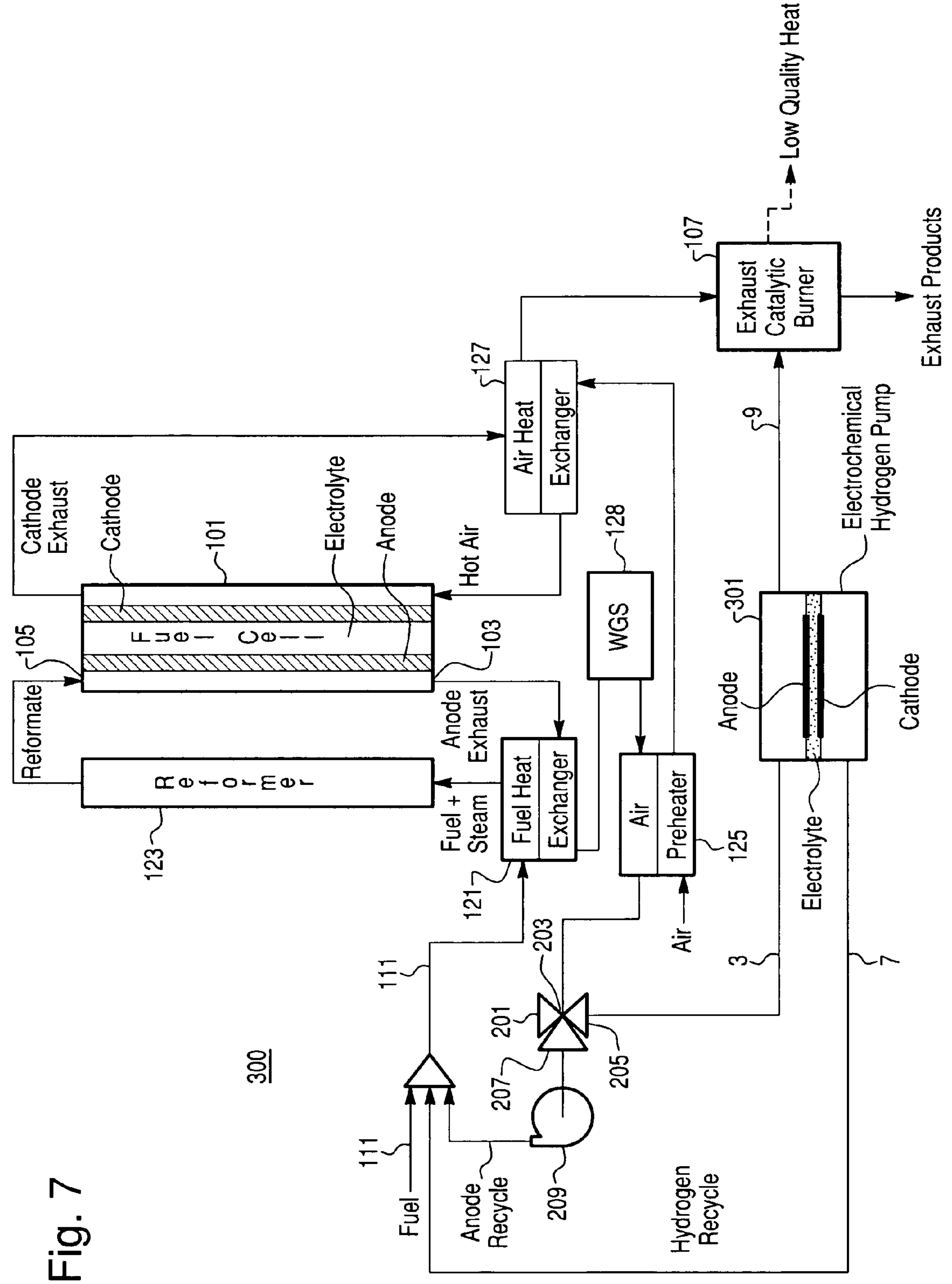
FIGS. 7 and 8 are schematic diagrams of exemplary fuel cell systems that can be operated according to the methods of the present invention.

The atomic or molecular hydrogen introduced at the fuel inlet can come from a variety of sources. In preferred embodiments of the present invention, at least a portion of the anode exhaust stream is recycled, i.e., diverted and reintroduced into the fuel cell along with the fuel flow. Some related embodiments may contain an optional water-gas shift reactor 128, as shown in FIG. 7. In these embodiments, at least a portion of this recycled anode exhaust flow is passed through a water-gas shift reactor 128 to enrich the amount of molecular hydrogen in the flow. At least a portion of the resulting enriched flow is then recycled, i.e., diverted and reintroduced into the fuel cell along with the fuel flow. The water-gas shift reactor 128 may be any suitable device which converts at least a portion of the water and carbon monoxide in the fuel exhaust stream into molecular hydrogen and carbon dioxide. For example, the reactor 128 may comprise a tube or conduit containing a catalyst which converts some or all of the carbon monoxide and water vapor in the fuel exhaust stream into carbon dioxide and hydrogen. The catalyst may be any suitable catalyst, such as an iron oxide or a chromium promoted iron oxide catalyst. The reactor 128 may be located between the fuel heat exchanger 121 and the air preheater heat exchanger 125.

In alternate embodiments of the invention, the hydrogen fuel source is independent of the exhaust flow and may comprise any known separate hydrogen source, such as a commercially available gas cylinder or tank.

Fuel Cell Operation with Preferably Partial Fuel Pre-reformation and Anode Exhaust Recycling The inventors have discovered that anode leading edge damage in a fuel cell system can also be reduced by decreasing the concentration of hydrocarbon fuel at the fuel inlet without changing the S:C ratio.

U.S. patent application Ser. No. 12/149,816 (filed May 8, 2008) disclosed operation of a fuel cell system with no anode exhaust recycling. While using methane as fuel, the system was operated with a S:C ratio in a nominal operating range of 2:1 to 2.5:1. As discussed in Example 5 below, the concentration of the hydrocarbon fuel at the fuel inlet is between about 33.3% to about 28.6% under these operating conditions Because of increased carbon formation and leading edge damage inherent with introduction of steam into the fuel cell system described above, reducing hydrocarbon fuel concentration in the fuel flow simply by increasing the S:C ratio is not preferred. In certain embodiments of the present invention, the fuel concentration is decreased at the fuel inlet by partially recycling the anode exhaust flow and partially reforming the fuel flow prior to its introduction into the fuel inlet.

In these embodiments, a portion of the anode exhaust gas is recycled, i.e. reintroduced into the fuel cell system at the fuel inlet with the hydrocarbon fuel. Preferably, the percentage of anode exhaust gas being recycled is up to 70%; more preferably the percentage is within the range of 55% and 65%, inclusive.

At this level of anode exhaust gas recycling, the amount of $H_2O$, $CO_2$, and CO in the recycled exhaust stream is not inconsequential and therefore should be considered when determining the amount of steam necessary to operate the fuel cell system. However, because the carbon contained in the recycled anode exhaust stream is not in the form of hydrocarbon fuel, the hydrocarbon fuel is effectively diluted in the fuel flow without changing the elemental composition of the flow. In these embodiments, the concentration of fuel at the fuel inlet may be reduced by as much as 40% compared to systems without recycled anode exhaust gas.

In preferred embodiments of this aspect, the hydrocarbon fuel is preferably partially reformed prior to introduction into the fuel cell system to further decrease the hydrocarbon fuel concentration at the fuel inlet. A reformer for use in such a system is one that is a suitable device capable of partially or wholly reforming a hydrocarbon fuel to form a carbon containing and free hydrogen containing fuel. For example, a reformer may comprise a reformer described in U.S. patent application Ser. No. 11/002,681 (filed Dec. 2, 2004), incorporated herein by reference in its entirety.

It is preferred that between 5% and 15%, for example 10%, of the fuel be reformed prior to introduction into the fuel cell system. In embodiments utilizing both anode exhaust recycling and partial pre-reformation, the concentration of hydrocarbon fuel at the fuel inlet may be reduced by as much as 50% compared to systems without recycled anode exhaust gas and fuel pre-reformation.

Figure 8:
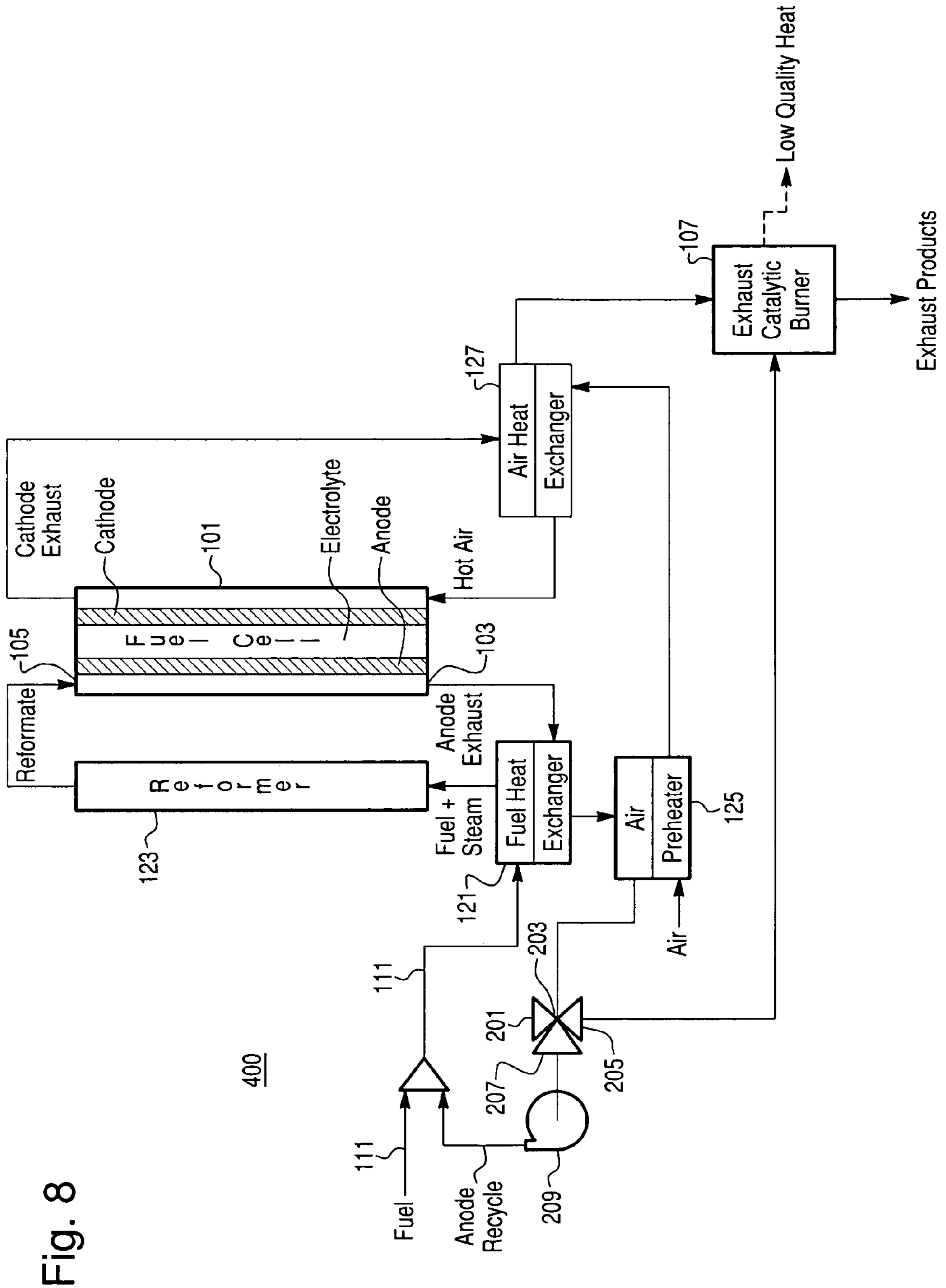

Several types of fuel cell systems that can be operated according to the methods of the present invention are described in U.S. patent application Ser. No. 11/491,487, filed on Jul. 24, 2006, incorporated herein by reference in its entirety. Schematics of two such systems are shown in FIGS. 7 and 8. FIG. 7 illustrates one type of fuel cell system 300 that contains a fuel cell stack 101, such as a solid oxide fuel cell stack (illustrated schematically to show one solid oxide fuel cell of the stack containing a ceramic electrolyte, such as yttria or scandia stabilized zirconia, an anode electrode, such as a nickel-stabilized zirconia cermet, and a cathode electrode, such as lanthanum strontium manganite).

In the system 300, the fuel exhaust stream is provided directly from valve 201 into the electrochemical pump 301, which electrochemically separates the hydrogen from the fuel exhaust stream. Furthermore, the blower or compressor 209 may be omitted if the pump 301 is capable of controllably providing a desired amount of hydrogen into the fuel inlet stream.

The pump 301 may comprise any suitable proton exchange membrane device comprising a polymer electrolyte. The hydrogen diffuses through the polymer electrolyte under an application of a potential difference between anode and cathode electrodes located on either side of the electrolyte. Preferably, the electrochemical pump comprises a stack of carbon monoxide tolerant electrochemical cells, such as a stack of high-temperature, low-hydration ion exchange membrane cells. This type of cell includes a non-fluorinated ion exchange ionomer membrane, such as, for example, a polybenzimidazole (PBI) membrane, located between anode and cathode electrodes. The membrane is doped with an acid, such as sulfuric or phosphoric acid. An example of such cell is disclosed in US published application US 2003/0196893 A1, incorporated herein by reference in its entirety. These cells operate in a temperature range of above 100 to about 200 degrees Celsius. Thus, if present, the heat exchanger 121 and the optional heat exchanger 125 preferably keep the fuel exhaust stream at a temperature of about 120 to about 200 degrees Celsius such as about 160 to about 190 degrees Celsius.

The system 300 also contains a third conduit 7 which operatively connects an outlet of the pump 301 to an optional hydrogen storage vessel or to the hydrogen using device (not shown). If desired, the third conduit 7 also operatively connects an outlet of the pump 301 to a fuel inlet conduit 111 of the fuel cell stack 101.

The system 300 also contains the fourth conduit 9 which removes the exhaust from the pump 301. The conduit 9 may be connected to a catalytic anode tail gas oxidizer 107 or to an atmospheric vent. Optionally, the anode tail gas oxidizer 107 may also be operatively connected to the stack fuel exhaust outlet 103 to provide a portion of the fuel exhaust stream into the anode tail gas oxidizer 107 to sustain the reaction in the anode tail gas oxidizer.

The system 300 also contains a recuperative heat exchanger 121 which exchanges heat between the stack fuel exhaust stream and the hydrocarbon fuel inlet stream being provided from the inlet conduit 111. The heat exchanger helps to raise the temperature of the fuel inlet stream and reduces the temperature of the fuel exhaust stream so that it may be further cooled in the condenser and such that it does not damage the humidifier.

If the fuel cells are external fuel reformation type cells, then the system 300 contains a fuel reformer 123. The reformer 123 reforms a hydrocarbon fuel inlet stream into hydrogen and carbon monoxide containing fuel stream which is then provided into the stack 101. The reformer 123 may be heated radiatively, convectively and/or conductively by the heat generated in the fuel cell stack 101 (i.e., the reformer is thermally integrated with the stack) and/or by the heat generated in an optional anode tail gas oxidizer, as described in U.S. patent application Ser. No. 11/002,681, filed Dec. 2, 2004, incorporated herein by reference in its entirety. Alternatively, the external reformer 123 may be omitted if the stack 101 contains cells of the internal reforming type where reformation occurs primarily within the fuel cells of the stack.

Optionally, the system 300 also contains an air preheater heat exchanger 125. This heat exchanger 125 heats the air inlet stream being provided to the fuel cell stack 101 using the heat of the fuel cell stack fuel exhaust. If desired, this heat exchanger 125 may be omitted.

The system 300 also preferably contains an air heat exchanger 127. This heat exchanger 127 further heats the air inlet stream being provided to the fuel cell stack 101 using the heat of the fuel cell stack air (i.e., oxidizer or cathode) exhaust. If the preheater heat exchanger 125 is omitted, then the air inlet stream is provided directly into the heat exchanger 127 by a blower or other air intake device.

The system 300 may also contain an optional water-gas shift reactor 128. Reactors suitable for use as water-gas shift reactors 128 are described in detail above. The reactor 128 may be located between the fuel heat exchanger 121 and the air preheater heat exchanger 125.

Optionally, the system 300 may be operatively connected to a hydrogen storage vessel or a hydrogen using device (not shown). However, the vessel or device may be omitted and the system 300 may be used to only produce electricity rather than electricity and hydrogen together. The hydrogen storage vessel may comprise a hydrogen storage tank or a hydrogen dispenser. The vessel may contain a conduit leading to a hydrogen using device which is used in transportation, power generation, cooling, hydrogenation reactions, or semiconductor manufacture. For example, the system 300 may be located in a chemical or a semiconductor plant to provide primary or secondary (i.e., backup) power for the plant as well as hydrogen for use in hydrogenation (i.e., passivation of semiconductor device) or other chemical reactions which require hydrogen that are carried out in the plant.

The optional hydrogen using device may also comprise another fuel cell system (such as a fuel cell stack), such as low temperature fuel cell system, such as a proton exchange membrane (PEM) fuel cell system, which uses hydrogen as a fuel. Thus, a portion of hydrogen from the system 300 may be provided as fuel to one or more additional fuel cells. For example, the system 300 may be located in a stationary location, such as a building or an area outside or below a building and be used to provide power to the building. The additional fuel cells may be located in vehicles located in a garage or a parking area adjacent to the stationary location. A vehicle may comprise a car, sport utility vehicle, truck, motorcycle, boat or any other suitable fuel cell powered vehicle. In this case, the hydrocarbon fuel is provided to the system 300 to generate electricity for the building and to generate hydrogen which is provided as fuel to the fuel cell system 300 and the fuel cell system powered vehicles. The generated hydrogen may be stored temporarily in the hydrogen storage vessel and then provided from the storage vessel to the vehicle fuel cells on demand (analogous to a gas station) or the generated hydrogen may be provided directly from the system 300 to the vehicle fuel cells through a conduit.

The system 300 may contain an optional hydrogen conditioner. The hydrogen conditioner may be any suitable device which can purify, dry, compress (i.e., a compressor), or otherwise change the state point of the hydrogen-rich gas stream provided from the pump 301. If desired, the hydrogen conditioner may be omitted.

The system 300 also contains a fuel splitter device 201, such as a computer or operator controlled multi-way valve, for example a three-way valve, or another fluid splitting device. The device 201 contains an inlet 203 operatively connected to the fuel cell stack fuel exhaust outlet 103, a first outlet 205 operatively connected to the pump 301 and a second outlet 207 operatively connected to the fuel cell stack fuel inlet 105. For example, the second outlet 207 may be operatively connected to the fuel inlet conduit 111, which is operatively connected to inlet 105. However, the second outlet 207 may provide a portion of the fuel exhaust stream into the fuel inlet stream further downstream.

The hydrogen separation method described in system 300 is not the only such method that may be used. Alternative hydrogen separation devices may be incorporated into the system, such as a partial pressure swing adsorption unit of the type described in described in U.S. application Ser. No. 11/188,120, filed on Jul. 25, 2005 and incorporated herein by reference in its entirety. These units may comprise a plurality of adsorbent beds and act as a regenerative dryer and carbon dioxide scrubber. However, any suitable method or device that serves to enrich hydrogen in a gas flow may be utilized.

FIG. 8 illustrates a different exemplary system 400. The system 400 is similar to system 300, except that the second separated fuel exhaust stream provided from valve 201 is not subjected to hydrogen separation. Instead, the second separated fuel exhaust stream provided from the valve 201 is either vented or provided to the anode tail gas oxidizer 107. This means that system 400 is simpler than system 300, since it does not include hydrogen separation steps and equipment. The method of operating the system 400 allows the use of a low temperature blower 209 by cooling the fuel exhaust stream to less than 200 degrees Celsius, such as about 90 to 110 degrees Celsius, by passing this stream through heat exchangers 121 and 125 in series.

In some embodiments of the present invention, the amount of fuel exhaust provided into the fuel inlet stream is controlled by an operator or automatically by a computer to achieve a steam to carbon ratio of less than 2:1 in the fuel inlet stream. The first separated fuel exhaust stream contains steam and the fuel inlet stream comprises a hydrocarbon fuel inlet stream, such as a methane or natural gas stream. Thus, the amount of fuel exhaust (and thus the amount of steam) provided into the fuel inlet stream is controlled to achieve a steam to carbon ratio of less than 2:1, (including less than or equal to 1.8:1), such as a 1.9:1 to a 1:1 ratio, for example a 1.6:1 to a 1.2:1 ratio, such as a 1.4:1 ratio, in the fuel inlet stream. The amount of fuel exhaust being recycled into the fuel inlet stream can be varied continuously or intermittently to continuously maintain the steam to carbon ratio less than 2:1 in the fuel inlet stream during operation of the fuel cell stack.

Anode and Cathode Symmetry

The inventors have also realized that in at least in some circumstances, the relative geometries of the anode and cathode may affect internal carbon formation and deposition on anode electrodes. For example, in fuel cell systems with direct internal reformation, increased carbon deposition may be observed on the anode at points of asymmetry between an anode and the corresponding cathode of the same cell. In particular, direct internal reformation fuel cell systems with anodes that cover more area than their corresponding cathodes may exhibit increased carbon deposition on the anodes at portions which do not overlap with the cathode. Without wishing to be bound by a particular theory, the inventors believe that this may be caused by a local reduction in temperature caused by reformation at the leading edge of the anode and a diminished flow of electrons at the areas of anode and cathode asymmetry. As such, some embodiments utilize an anode and cathode that are symmetrical at least in the region where fuel enters the fuel cell in order to reduce carbon deposition on the anode. In other embodiments, the anode and cathode may be symmetrical around their entire area (i.e., both electrodes have the same shape and are located at the same location on opposite sides of the electrolyte).

Figure 9A:
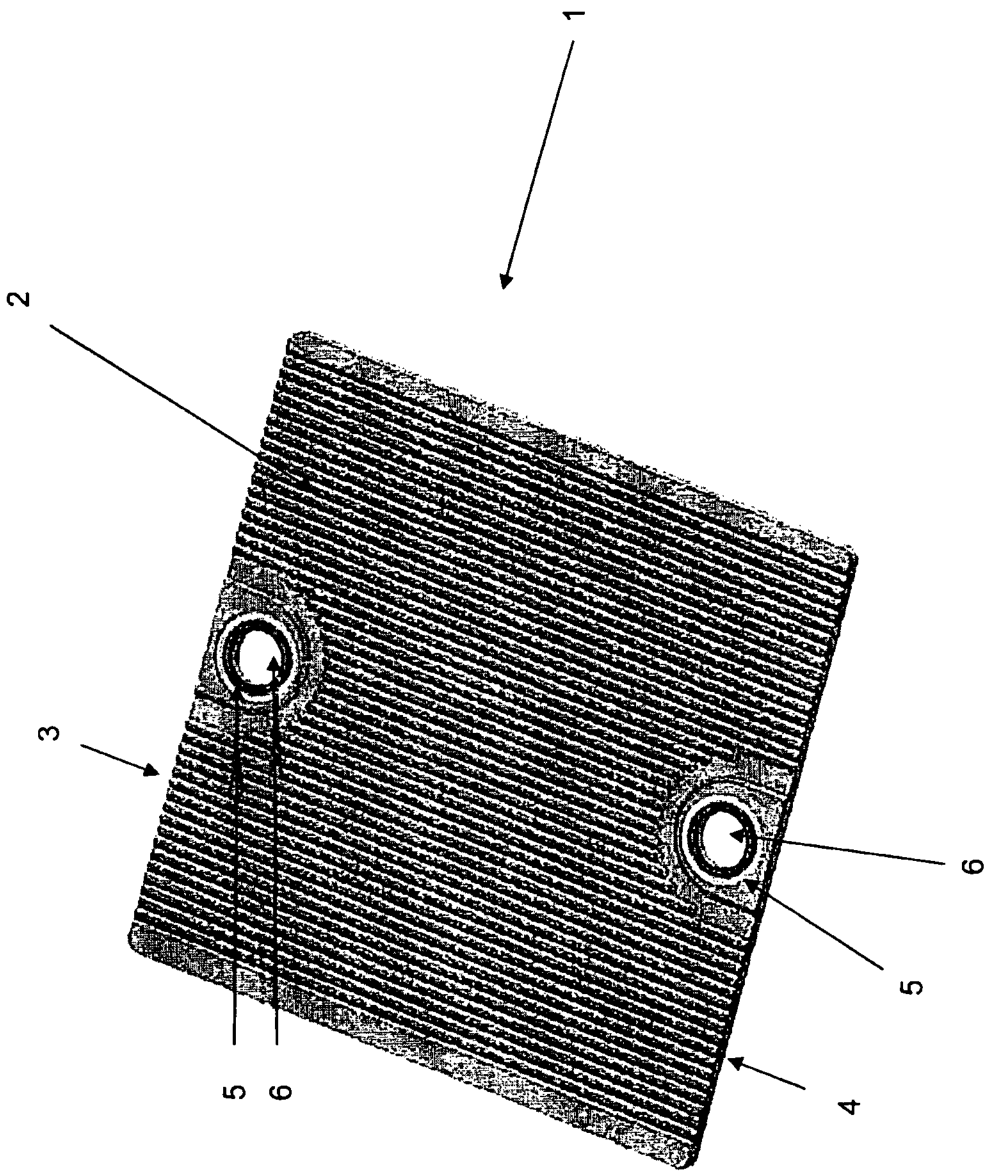
FIGS. 9A and 9B are three dimensional views of the air and fuel sides, respectively, of an interconnect according to one embodiment of the invention.
Figure 9B:
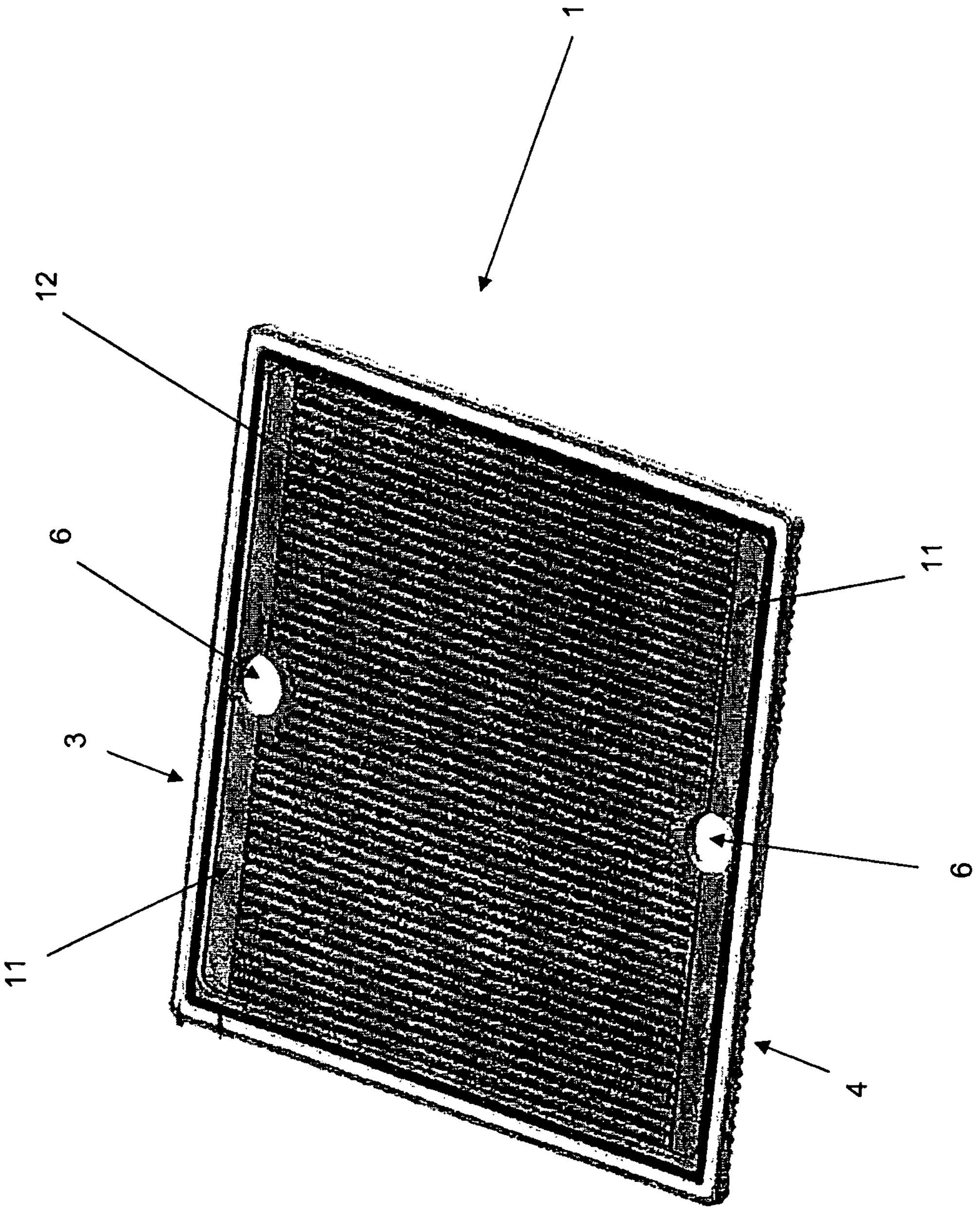

FIG. 9A shows the air side of an exemplary interconnect 1. The interconnect may be used in a stack which is internally manifolded for fuel and externally manifolded for air. The interconnect contains air flow grooves 2 to allow air to flow from one side 3 to the opposite side 4 of the interconnect. Ring seals 5 are located around fuel riser openings 6. FIG. 9B illustrates the fuel side of the interconnect 1. Fuel distribution plenums 11 and fuel flow grooves 12 are found on this side.

In a fuel cell stack, a cathode electrode of one cell contacts the air side of an interconnect 1, while an anode electrode of the same cell contacts the fuel side of an adjacent interconnect 1. In the exemplary case illustrated in FIGS. 9A and 9B, in a stack that is internally manifolded for fuel and externally manifolded for air, the two sides of the interconnect 1 are not identical. In particular, the two sides of the interconnect differ at areas encompassing the fuel distribution plenums 11 (which are absent on the air side) and fuel riser opening area 6 (which contains a seal on the air side only).

In general, prior art anode and cathode electrodes are not symmetrical and have a different shape where the air and fuel sides of the interconnect have a different shape. For example, for an interconnect shown in FIGS. 9A and 9B, the prior art anode electrode would contain a portion located adjacent to the fuel inlet riser opening and another portion over the fuel distribution plenums on the fuel side of the interconnect, while the cathode electrode would lack a portion located adjacent to the fuel inlet riser opening 6 (e.g., because the seal 5 is located around the opening 6 on the air side of the interconnect) and the cathode would also lack a portion in a location corresponding to the fuel distribution plenums on the fuel side of the interconnect.

In the present embodiment, the anode and cathode electrodes are symmetrical at least in the region where the fuel enter the fuel cell, such as the region adjacent to the fuel inlet riser opening 6 in the electrolyte. Preferably the anode electrode is offset from the fuel inlet riser opening by at least 4 mm, such as by 5-20 mm. Preferably the cathode electrode is also offset from the fuel inlet riser opening by at least 4 mm, such as by 5-20 mm.

Figure 10A:
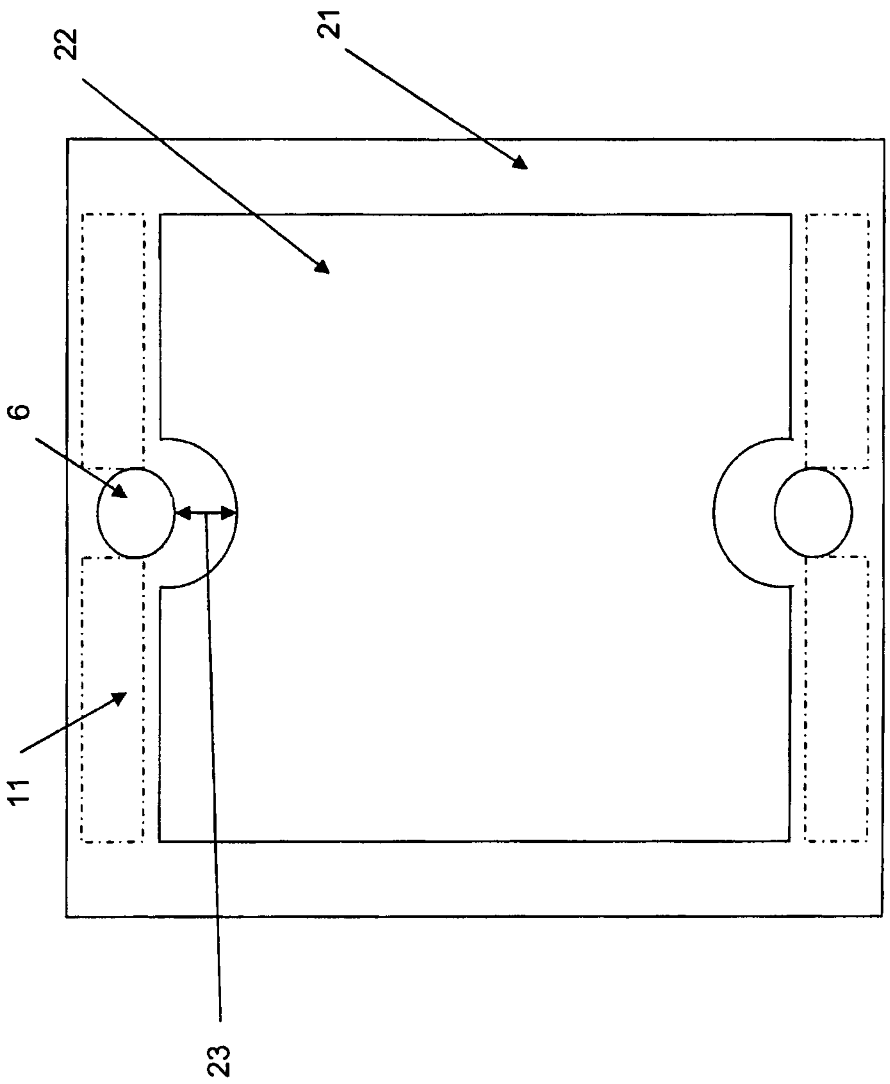
FIGS. 10A and 10B are top views the anode side of a fuel cell according to one embodiment of the invention.
Figure 10B:
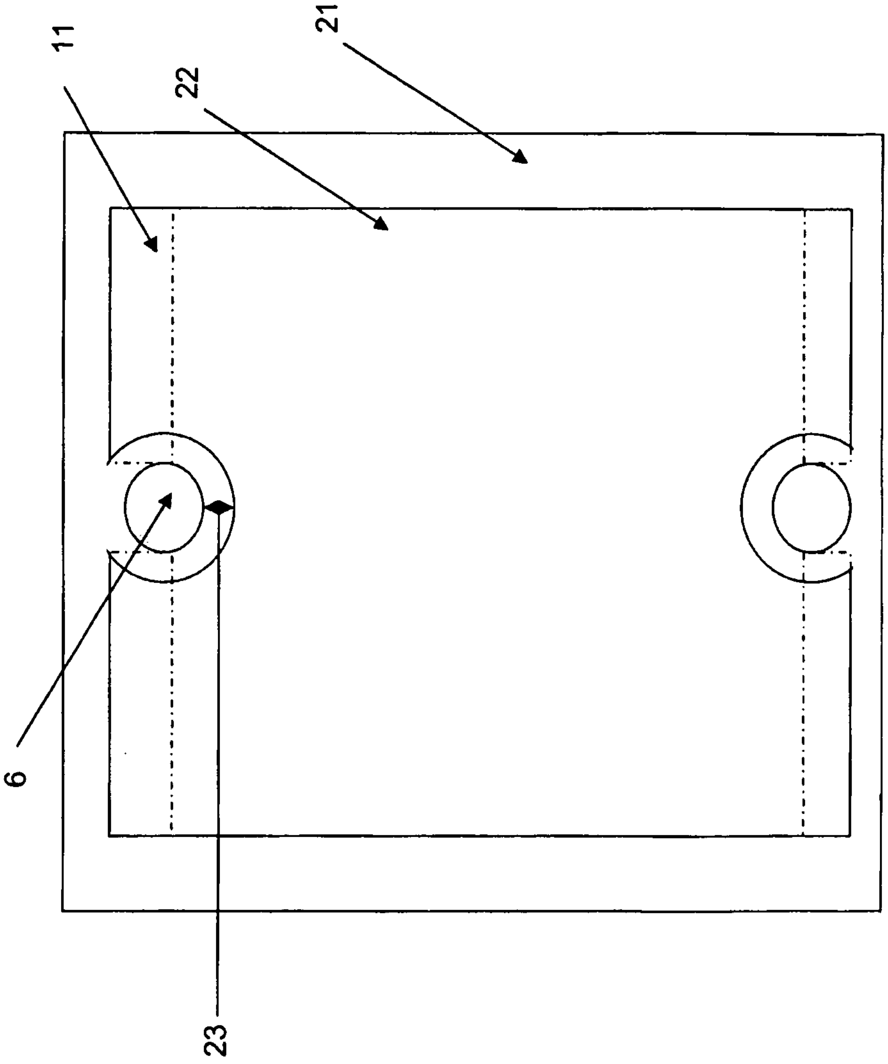

FIGS. 10A and 10B illustrate exemplary anode electrode configurations. As shown in these figures, the anode electrode 22 (such as a nickel and doped ceria or nickel and stabilized zirconia cermet) is formed on the solid oxide electrolyte 21 (such as a doped ceria or stabilized zirconia ceramic electrolyte). The anode electrode is offset from the fuel inlet riser opening 6 in the electrolyte by a distance 23 of at least 4 mm, such as by 5-20 mm. Preferably, the cathode electrode has the same shape and same location as the anode electrode on the opposite side of the electrolyte at least adjacent to the opening 6.

In the embodiment illustrated in FIG. 10A, the anode electrode 22 is not located over a fuel distribution plenum 11 (shown in dashed lines) in a fuel side of the adjacent interconnect. In the embodiment illustrated in FIG. 10B, the anode electrode 22 is located over a fuel inlet distribution plenum 11 (shown in dashed lines) in a fuel side of the adjacent interconnect. In both cases, the anode electrode is offset from the fuel inlet riser opening 6 by distance 23. The anode electrode may or may not be offset from the fuel exhaust riser opening on the outlet end of the electrolyte and may or may not be located over the fuel exhaust distribution plenum on the outlet end of the interconnect. In the embodiments of FIGS. 10A and 10B, the cathode electrode is not located over location corresponding to the fuel distribution plenums on the fuel side of the interconnect. Thus, in the embodiment of FIG. 10A, the anode and cathode electrodes are fully symmetrical around their entire areas while in the embodiment of FIG. 10B, the anode and the cathode are symmetrical at least in the region where fuel enters the fuel cell.

EXAMPLES

Example 1

Effect of S:C Ratio of about 1.4:1 on Operation of a SOFC with an External Reformer An SOFC system with five cells and an external reformer was operated with natural gas as fuel and hydrogen (i.e., $H_2$) introduction at the fuel inlet. For this Example and Example 2, an assumption was made that the natural gas used as fuel was 100% methane (i.e., $CH_4$). This assumption was made to simplify the determination of the S:C and $H_2$:$C_{fuel}$ ratios. For example, for systems operating with methane as fuel, the $H_2$:$C_{fuel}$ ratio is equal to the $H_2$:$CH_4$ ratio. Thus for this Example and Example 2, the $H_2$:$C_{fuel}$ ratio is represented as $H_2$:$CH_4$ ratio.

Additional operating conditions for this SOFC system were about 80% single pass fuel utilization, about 25% air utilization, current generation of about 35 amps, and air out temperature of about 825° C.

Stable operation of the system was established and demonstrated under these conditions with a $H_2$:$CH_4$ ratio of about 1:1 at the fuel inlet and a S:C ratio in excess of 2:1. Gas flows at the fuel inlet were then adjusted such that the $H_2$:$CH_4$ ratio of about 1:1 was maintained, but the S:C ratio was dropped to about 1.4:1 and the effect on the cell voltages was monitored.

FIG. 1 contains a plot of the S:C ratio of the system across an approximately sixty hour time interval. As seen in FIG. 1, the change in the S:C ratio occurs at approximately time point 6,890 hours of stack operation.

Figure 2:
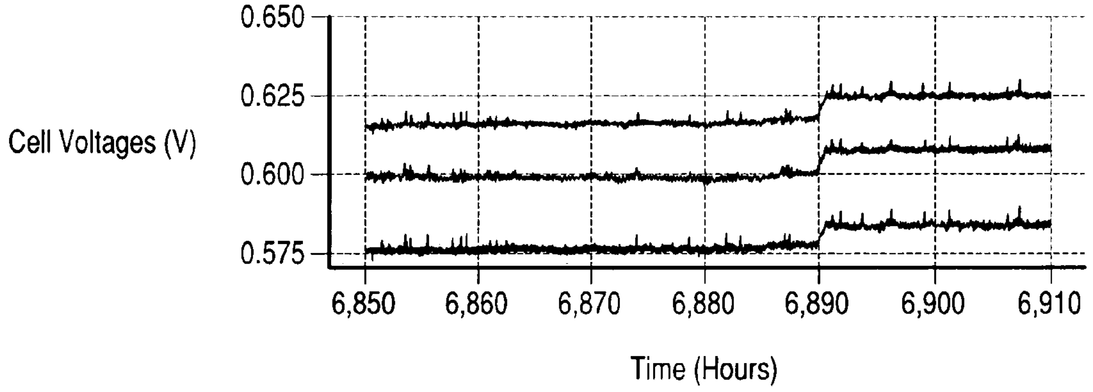
FIG. 2 is a plot of the cell voltages of a SOFC operating with externally reformed natural gas as fuel and hydrogen ($H_2$) being introduced with the fuel at a hydrogen to methane ($H_2$:$CH_4$) ratio of about 1:1 at the fuel inlet across an approximately sixty hour time interval. For purposes of determining the steam to carbon (S:C) and hydrogen to methane ($H_2$:$CH_4$) ratios, natural gas was assumed to be 100% methane ($CH_4$).

FIG. 2 contains a plot of the cell voltages across the same time interval. As seen in FIG. 2, cell voltages unexpectedly increased as a result of the decrease in the S:C ratio.

The operation of this SOFC system was continued under reduced S:C ratio operating conditions for in excess of 1000 hours without any indication of adverse impact from carbon formation.

Example 2

Effect of S:C Ratio of about 1.2:1 on Operation of a SOFC with an External Reformer Stable operation of a SOFC system as described in Example 1 with a S:C ratio of about 1.4:1 was established. The gas flows at the fuel inlet were then adjusted such that the $H_2$:$CH_4$ ratio of about 1:1 was maintained, but the S:C ratio was dropped to about 1.2:1 and the effect on the cell voltages was monitored.

Figure 3:
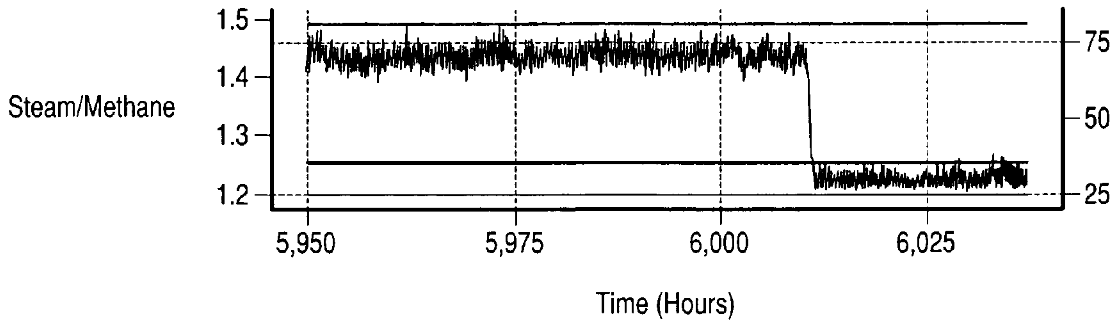
FIG. 3 is a plot of the S:C ratio versus time of a SOFC operating with externally reformed natural gas as fuel and hydrogen ($H_2$) being introduced with the fuel at a hydrogen to methane ($H_2$:$CH_4$) ratio of about 1:1 at the fuel inlet across an approximately eighty five hour time interval. For purposes of determining the steam to carbon (S:C) and hydrogen to methane ($H_2$:$CH_4$) ratios, natural gas was assumed to be 100% methane ($CH_4$).

FIG. 3 contains a plot of the S:C ratio of the system across an approximately eighty five hour time interval. As seen in FIG. 3, the change in the S:C ratio occurs at approximately time point 6,010 hours of stack operation.

Figure 4:
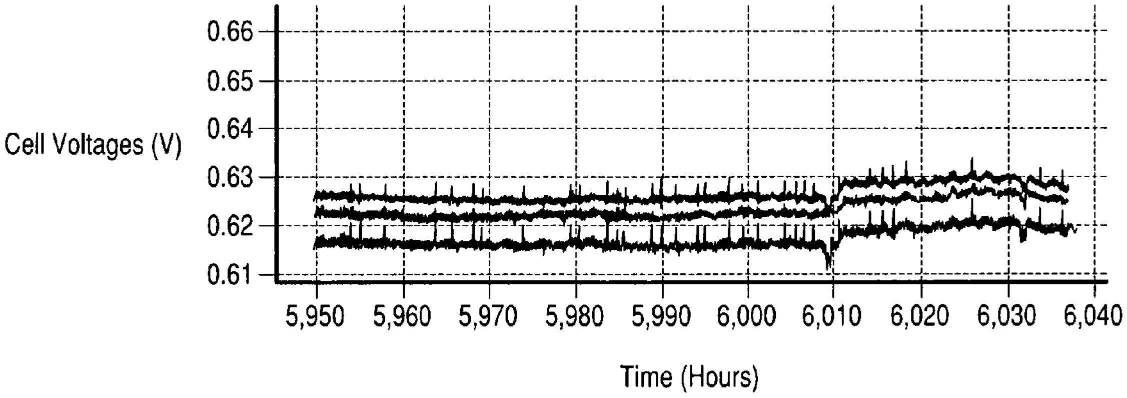
FIG. 4 is a plot of the cell voltages of a SOFC operating with externally reformed natural gas as fuel and hydrogen ($H_2$) being introduced with the fuel at a hydrogen to methane ($H_2$:$CH_4$) ratio of about 1:1 at the fuel inlet across an approximately eighty five hour time interval. For purposes of determining the steam to carbon (S:C) and hydrogen to methane ($H_2$:$CH_4$) ratios, natural gas was assumed to be 100% methane ($CH_4$).

FIG. 4 contains a plot of the cell voltages across a time interval containing the time interval demonstrated in FIG. 3. As seen in FIG. 4, cell voltages unexpectedly increased as a result of the decrease in the S:C ratio. Although the magnitude of the increase in cell voltages was not as great as that seen in Example 1, an unexpected increase in cell voltages was observed and the operation of the system remained stable.

Example 3

Effect of Hydrogen Injection on Operation of a SOFC with Internal Reformation An SOFC system with five cells and an internal reformation catalyst in the anode was operated with methane as fuel and hydrogen introduction at the fuel inlet at a $H_2$:$CH_4$ ratio of about 1:1 at the fuel inlet. The system was operated with a S:C ratio of approximately 2:1. The operation of this SOFC system was continued under these conditions in excess of 2000 hours without any indication of adverse impact from carbon formation or anode leading edge damage.

Example 4

Effect of S:C Ratio of about 1.6:1 on Operation of Internally Reformed SOFC

An SOFC system with five cells and an internal reformation catalyst was operated with methane as fuel and hydrogen introduction at the fuel inlet at a $H_2$:$CH_4$ ratio of 1:1 at the fuel inlet. The system was initially operated with a S:C ratio of approximately 1.8:1. After stable operation of the system was established and demonstrated, the gas flows at the fuel inlet were adjusted such that the $H_2$:$CH_4$ ratio of about 1:1 was maintained, but the S:C ratio was dropped to approximately 1.6:1 and the effect on the cell voltages was monitored. The SOFC was operated with current generation of about 35 amps and an air out temperature of about 825° C.

Figure 5:
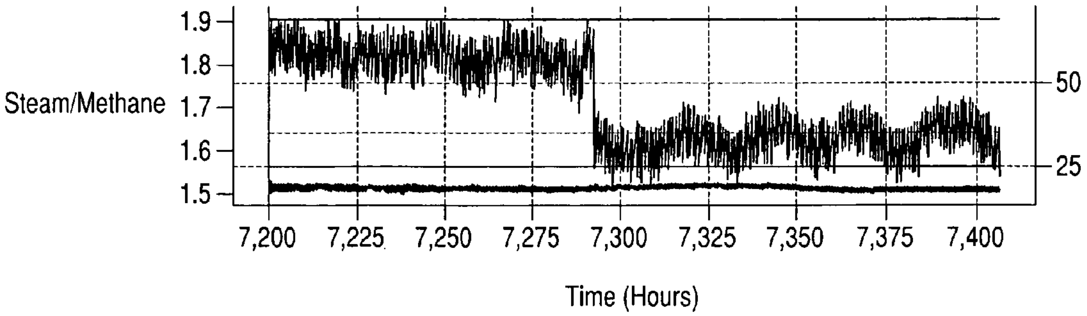
FIG. 5 is a plot of the S:C ratio versus time of a SOFC operating with hydrogen and internally reformed methane at a $H_2$:$CH_4$ ratio of about 1:1 at the fuel inlet across an approximately two hundred and five hour time interval.

FIG. 5 contains a graphical representation of the S:C ratio of the system across an approximately two hundred and five hour time interval. As seen in FIG. 5, the change in the S:C ratio occurs at approximately time point 7,295 hours of stack operation.

Figure 6:
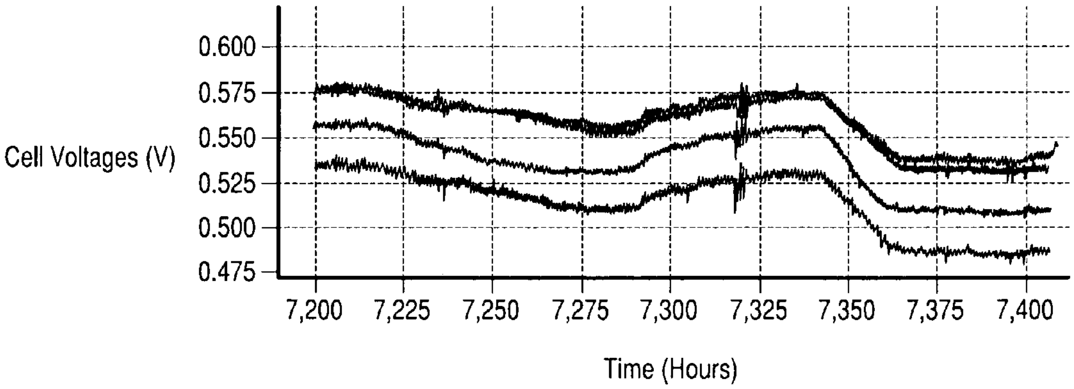
FIG. 6 is a plot of the cell voltages versus time of a SOFC operating with hydrogen and internally reformed methane at a $H_2$:$CH_4$ ratio of about 1:1 at the fuel inlet across an approximately two hundred and five hour time interval.

FIG. 6 contains a graphical representation of the cell voltages across a time interval containing the same time interval demonstrated in FIG. 5. As seen in FIG. 6, cell voltages also unexpectedly increased as a result of the decrease in the S:C ratio. The cell voltages can be seen to increase over the next approximately fifty hours, until time point 7,340 hours of stack operation. At this point, the cell voltages drop without any adjustment of the $H_2$:$CH_4$ or S:C ratios. This drop in cell voltages coincided with a routine change of tank containing fuel gas for the system. The inventors suspect that the replacement tank was contaminated, possibly with ethane, and that the drop in cell voltages observed at this time point is independent of the operational conditions described herein.

Example 5

Simulated Data for Operation of SOFC Stacks with Anode Recycling and Partial Pre-Reformation of Fuel Simulations of the operation of SOFC systems with varying S:C ratios, proportions of recycled anode exhaust gas, and proportions of fuel pre-reformation were conducted to determine the relative concentration of fuel at the inlet under various operating conditions. All simulations were based on systems with methane as fuel.

Table 1, below, includes data generated from these simulations.

TABLE 1

| Variable | Simulation 1 | Simulation 2 | Simulation 3 | Simulation 4 |
|---|---|---|---|---|
| Anode Recycle Fraction | 0.5727 | 0.6254 | 0.5727 | 0.6254 |
| S:C Ratio | 2.200 | 2.800 | 2.200 | 2.800 |
| Methane Pre-Reformation Fraction (%) | 0 | 0 | 10 | 10 |
| CO Fraction at Inlet (%) | 4.484 | 4.154 | 6.238 | 5.640 |
| $CO_2$ Fraction at Inlet (%) | 22.986 | 24.377 | 22.100 | 23.587 |
| $H_2O$ Fraction at Inlet (%) | 44.101 | 46.893 | 40.474 | 43.753 |
| $H_2$ Fraction at Inlet (%) | 8.812 | 8.165 | 14.196 | 12.713 |
| $CH_4$ Fraction at Inlet (%) | 18.978 | 15.855 | 16.442 | 13.807 |

The $CH_4$ fraction at the inlet of a SOFC system operating with methane as fuel, no anode exhaust recycling, and no pre-reformation of the fuel is easily determined from the S:C ratio:

$$CH_4 \text{ Fraction at the Inlet} = (C/(S+C))*100\%;$$

where S and C come from the S:C ratio.

Thus, a SOFC system operating as described above with a S:C ratio within the range of 2:1 to 2.5:1, inclusive, will have a $CH_4$ fraction at the inlet in the range of about 33.3% and about 28.6%.

The data in Table 1 demonstrates that a SOFC stack operating with methane as fuel, a S:C ratio between 2.2 and 2.8, about 60% anode recycling, and no fuel pre-reformation (see Simulations 1 and 2) will have a significantly decreased $CH_4$ fraction at the inlet compared to a SOFC with no anode recycling. In fact, under these conditions, the range of $CH_4$ at the inlet decreases to 18.978% to 15.855%, inclusive. These values represent an approximate 45% reduction in $CH_4$ at the inlet compared to similar systems operating without anode exhaust recycling or pre-reformation.

Further reduction is seen when a portion of the fuel is pre-reformed. Simulations 3 and 4 demonstrate that about 60% anode exhaust recycling coupled with 10% pre-reformation of the fuel supply decreases the range of $CH_4$ at the inlet to the range of 16.442% to 13.807%, inclusive. This represents an approximate 50% reduction in the $CH_4$ at the inlet stream compared to similar systems operating without anode exhaust recycling or pre-reformation.

Example 6

Effect of Anode/Cathode Symmetry on Anode Carbon Deposition

Figure 11:
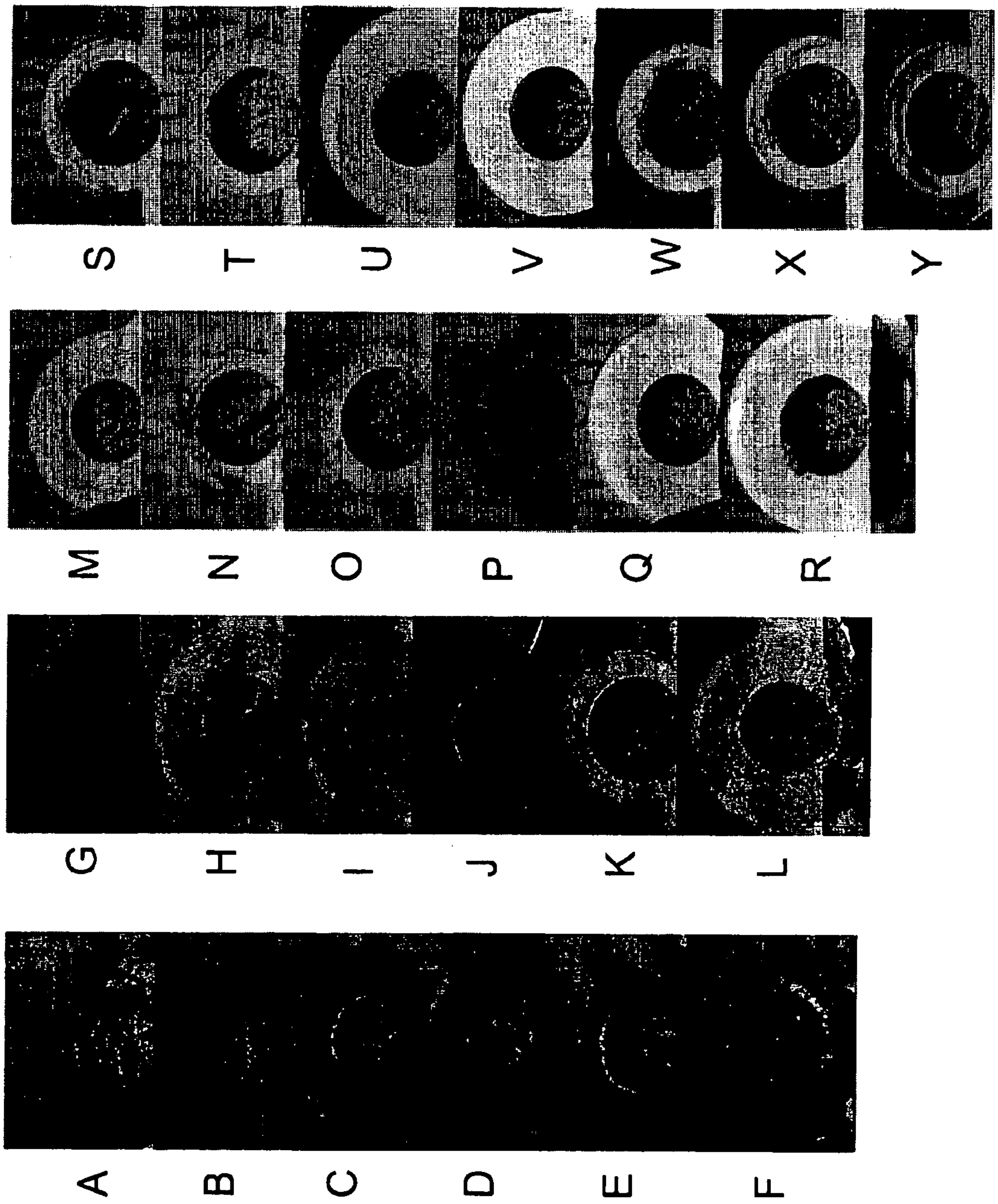
FIGS. 11A-Y are images of fuel inlet riser openings of fuel cells in a 25 fuel cell stack operated with various anode/cathode geometric configurations. Details are presented in Example 6.

FIGS. 11A-Y are photographs of the anode side of 25 fuel cells in the area around fuel inlet riser openings with various anode/cathode symmetries. The fuel cells are located in a 25 cell stack. The configurations utilized are summarized in Table 2. "Asymmetrical" means that the anode electrode is located adjacent to the fuel inlet riser opening while the cathode electrode is not. "Symmetrical" means that the anode and cathode electrodes are symmetrical at the fuel inlet riser opening and are each offset from the fuel inlet riser opening by a 5 mm distance. The last column in Table 2 describes the presence or absence of the anode over the fuel distribution plenum in the fuel side of the adjacent interconnect. In all cells, the cathode electrode is offset from the fuel inlet riser opening and is not present over the location of the fuel distribution plenum.

TABLE 2

Description of Anode/Cathode Geometries Utilized in the Cells Show in FIGS. 11A-Y

| FIG. # | Cell # | Anode/Cathode Configuration Adjacent To Fuel Inlet Manifold Riser | Anode Electrode Located Over Fuel Distribution Plenum? |
|---|---|---|---|
| FIG. 11A | 1 | Asymmetrical | Yes |
| FIG. 11B | 2 | Asymmetrical | Yes |
| FIG. 11C | 3 | Symmetrical | No |
| FIG. 11D | 4 | Symmetrical | Yes |
| FIG. 11E | 5 | Asymmetrical | Yes |
| FIG. 11F | 6 | Asymmetrical | Yes |
| FIG. 11G | 7 | Asymmetrical | Yes |
| FIG. 11H | 8 | Symmetrical | No |

TABLE 2-continued

Description of Anode/Cathode Geometries Utilized in the Cells Show in FIGS. 11A-Y

| FIG. # | Cell # | Anode/Cathode Configuration Adjacent To Fuel Inlet Manifold Riser | Anode Electrode Located Over Fuel Distribution Plenum? |
|---|---|---|---|
| FIG. 11I | 9 | Symmetrical | Yes |
| FIG. 11J | 10 | Asymmetrical | Yes |
| FIG. 11K | 11 | Asymmetrical | Yes |
| FIG. 11L | 12 | Symmetrical | No |
| FIG. 11M | 13 | Symmetrical | Yes |
| FIG. 11N | 14 | Asymmetrical | Yes |
| FIG. 11O | 15 | Asymmetrical | Yes |
| FIG. 11P | 16 | Asymmetrical | Yes |
| FIG. 11Q | 17 | Symmetrical | No |
| FIG. 11R | 18 | Symmetrical | Yes |
| FIG. 11S | 19 | Asymmetrical | Yes |
| FIG. 11T | 20 | Asymmetrical | Yes |
| FIG. 11U | 21 | Symmetrical | No |
| FIG. 11V | 22 | Symmetrical | Yes |
| FIG. 11W | 23 | Asymmetrical | Yes |
| FIG. 11X | 24 | Asymmetrical | Yes |
| FIG. 11Y | 25 | Asymmetrical | Yes |

As seen in FIGS. 11A-Y, fuel cells with anode and cathode symmetry at the region surrounding the fuel inlet riser demonstrate significantly less anode carbon deposition in this area. Specifically, the black material in the Figures is the coking, the grey color material is the anode material and the light color material around the opening is the exposed portion of the electrolyte.

The foregoing description of the invention has been presented for purposes of illustration and description. The methods and devices illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the invention embodied therein herein disclosed may be resorted to by those skilled in the art, and that such modifications and variations are considered to be within the scope of this invention. It is intended that the scope of the invention be defined by the claims appended hereto, and their equivalents.

What is claimed is:

1. A method of operating a fuel cell system, comprising:

introducing a fuel mixture comprising molecular hydrogen, a fuel comprising carbon and hydrogen, and steam at a fuel inlet of a fuel cell of the fuel cell system, said fuel mixture comprising an output of an external reformer that reforms a hydrocarbon fuel to form molecular hydrogen, and the external reformer is coupled to the fuel inlet of the fuel cell of the fuel cell system; and operating the fuel cell system to generate electricity, wherein a ratio of molecular hydrogen not contained in fuel to carbon contained in the fuel ($H2:C_{fuel}$) in said fuel mixture introduced at the fuel inlet of the fuel cell is within a range of 0.25:1 to 3:1, inclusive; and a ratio of steam to carbon (S:C) in said fuel mixture introduced at the fuel inlet of the fuel cell is less than 2:1.

2. The method of claim 1, wherein said fuel is selected from the group consisting of methane, natural gas, propane, alcohol, or syngas derived from coal or natural gas reformation.

3. The method of claim 1, wherein said fuel cell system is a solid oxide fuel cell system.

4. The method of claim 3, wherein said fuel cell system comprises a solid oxide fuel cell system with an internal reformer.

5. The method of claim 1, wherein said S:C ratio is less than or equal to 1.2:1.

6. The method of claim 1, wherein said $H_2:C_{fuel}$ ratio is within the range of 0.5:1 to 1.5:1.

7. The method of claim 6, wherein the recycled anode exhaust gas is up to 70% of the total anode exhaust gas.

8. The method of claim 7, wherein the recycled anode exhaust gas is 50% to 70% of the total anode exhaust gas.

9. The method of claim 6, further comprising converting steam to hydrogen in all or a portion of anode exhaust gas using a water-gas shift reactor prior to reintroduction of all or a portion of the reformed anode exhaust gas into the fuel cell system.

10. The method of claim 1, wherein a source of said molecular hydrogen is recycled anode exhaust gas.

11. A method of operating a fuel cell system, comprising:

partially reforming a hydrocarbon fuel in an external reformer that is coupled to a fuel inlet of a fuel cell of the fuel cell system;

introducing a fuel mixture comprising the partially reformed hydrocarbon fuel from the external reformer and recycled anode exhaust gas and including steam at the fuel inlet of the fuel cell of the fuel cell system, wherein a portion of the hydrocarbon fuel reformed in the external reformer prior to introduction at the fuel inlet is 5% to 15%; and operating the fuel cell system to generate electricity;

wherein the steam to carbon ratio (S:C) in said fuel mixture introduced at the fuel inlet of the fuel cell is 1:1 or greater and less than 2:1.

12. The method of claim 11, wherein said reforming a portion of said fuel is conducted with a catalytic reactor.

13. The method of claim 11, wherein the recycled anode exhaust gas is up to 70% of the total anode exhaust gas.

14. The method of claim 11, wherein an average cell voltage of the fuel cell system is increased as compared to operation of the fuel cell system operating at S:C greater than or equal to 2:1.

15. The method of claim 11, further comprising converting steam to hydrogen in anode exhaust gas using a water-gas shift reactor prior to reintroduction of the anode exhaust gas into the fuel cell system.

16. The method of claim 11, wherein the mixture comprises carbon monoxide, carbon dioxide, water vapor, hydrogen and fuel, and a percentage of said fuel in the mixture is less than or equal to 20%.

17. The method of claim 11, wherein the fuel comprises methane or natural gas and the percentage of said fuel in said mixture is within a range of about 13% to about 19%.

18. A solid oxide fuel cell stack, comprising:

a plurality of electrolyte-supported solid oxide fuel cells and a plurality of interconnects, each of the plurality of fuel cells comprising:

a solid oxide electrolyte having a first surface and a second surface and a fuel riser inlet opening extending through the solid oxide electrolyte;

an anode electrode on the first surface of the electrolyte and adapted for internal fuel reformation; and a cathode electrode on the second surface of the electrolyte, wherein the cathode electrode includes an outer edge that includes a concave-shaped offset region adjacent to at least a first side of the fuel inlet riser opening, and the concave-shaped offset region is offset from the fuel inlet riser opening by a first distance sufficient to accommodate a seal that surrounds the fuel inlet riser opening on the second surface of the electrolyte but not on the first surface of the electrolyte;

wherein the anode electrode and the cathode electrode are symmetrical in a region where fuel enters the fuel cell such that an outer edge of the anode electrode is exactly or substantially aligned with the outer edge of the cathode electrode on an opposite side of the electrolyte in the same fuel cell in the region where fuel enters the fuel cell, and the outer edge of the anode electrode includes a concave-shaped offset region adjacent to at least the first side of the fuel inlet riser opening, and the concave-shaped offset region of the outer edge of the anode electrode is offset from the fuel inlet riser opening by the first distance and wherein the solid oxide fuel cell stack is internally manifolded for fuel.

19. The stack of claim 18, wherein the anode and cathode are symmetrical around their entire area.

20. The stack of claim 18, wherein:

the region where fuel enters the fuel cell comprises a region near the fuel inlet riser opening in the electrolyte and the anode electrode is offset from the fuel inlet riser opening by at least 4 mm; and the fuel inlet riser opening is located adjacent to a first edge of the solid oxide electrolyte, and the outer edge of the anode electrode extends from the concave-shaped offset region in a straight line parallel to the first edge of the solid oxide electrolyte.

21. The stack of claim 20, wherein the anode electrode is located over a fuel distribution plenum in an adjacent interconnect.

22. The stack of claim 20, wherein the anode electrode is not located over a fuel distribution plenum in an adjacent interconnect.

* * * * *